Figure 9:
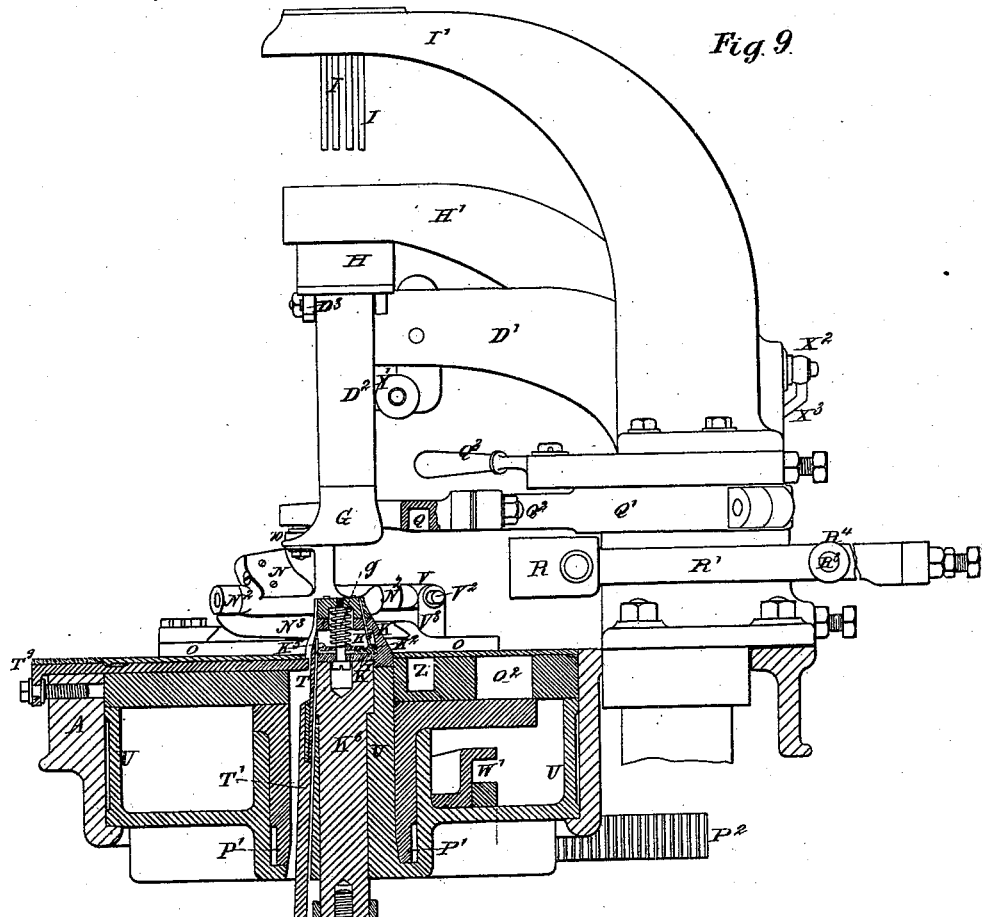

9 Sheets—Sheet 1.
T. COWBURN.
Heeling Machine for Boots and Shoes.
No. 230,242. Patented July 20, 1880.
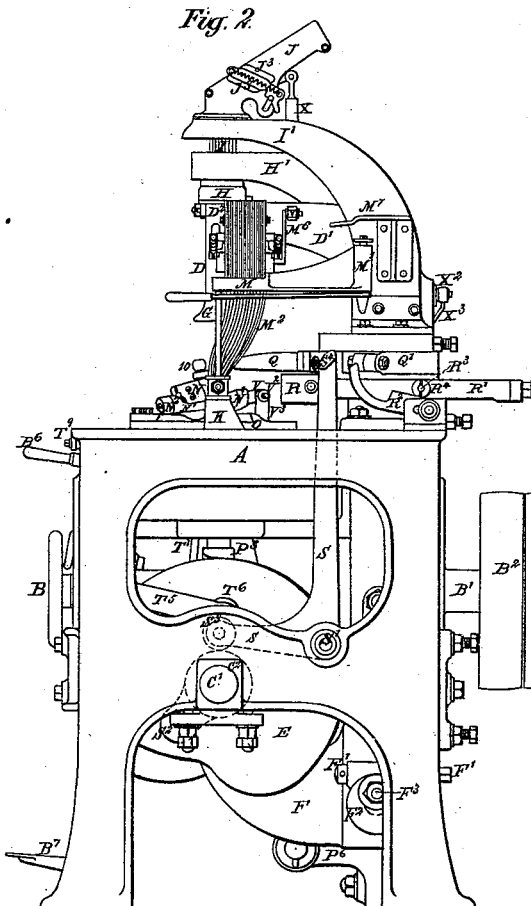
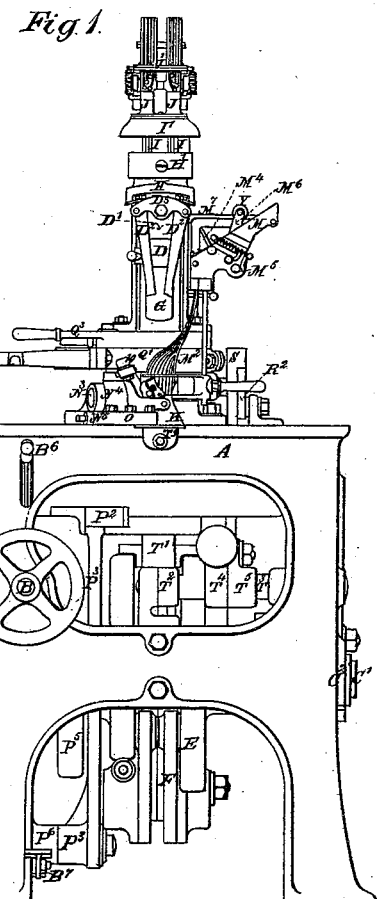
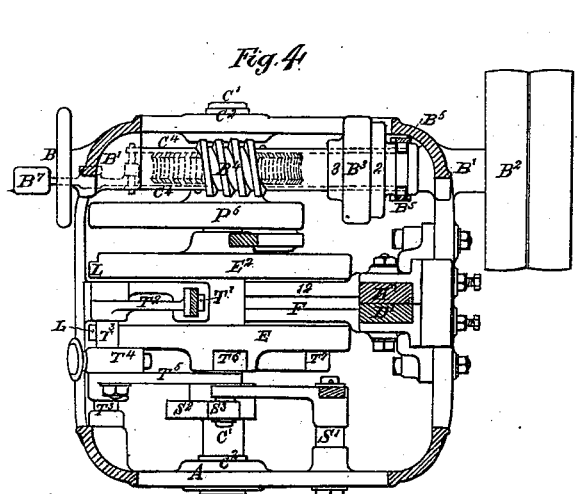
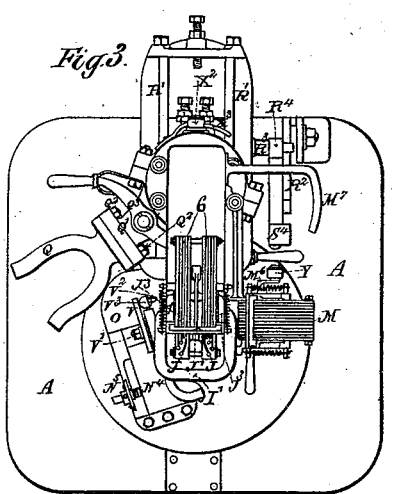
Witnesses
Henry Howson Jr.
Harry Smith
Inventor
Thomas Cowburn
by his Attorneys
Howson and Son

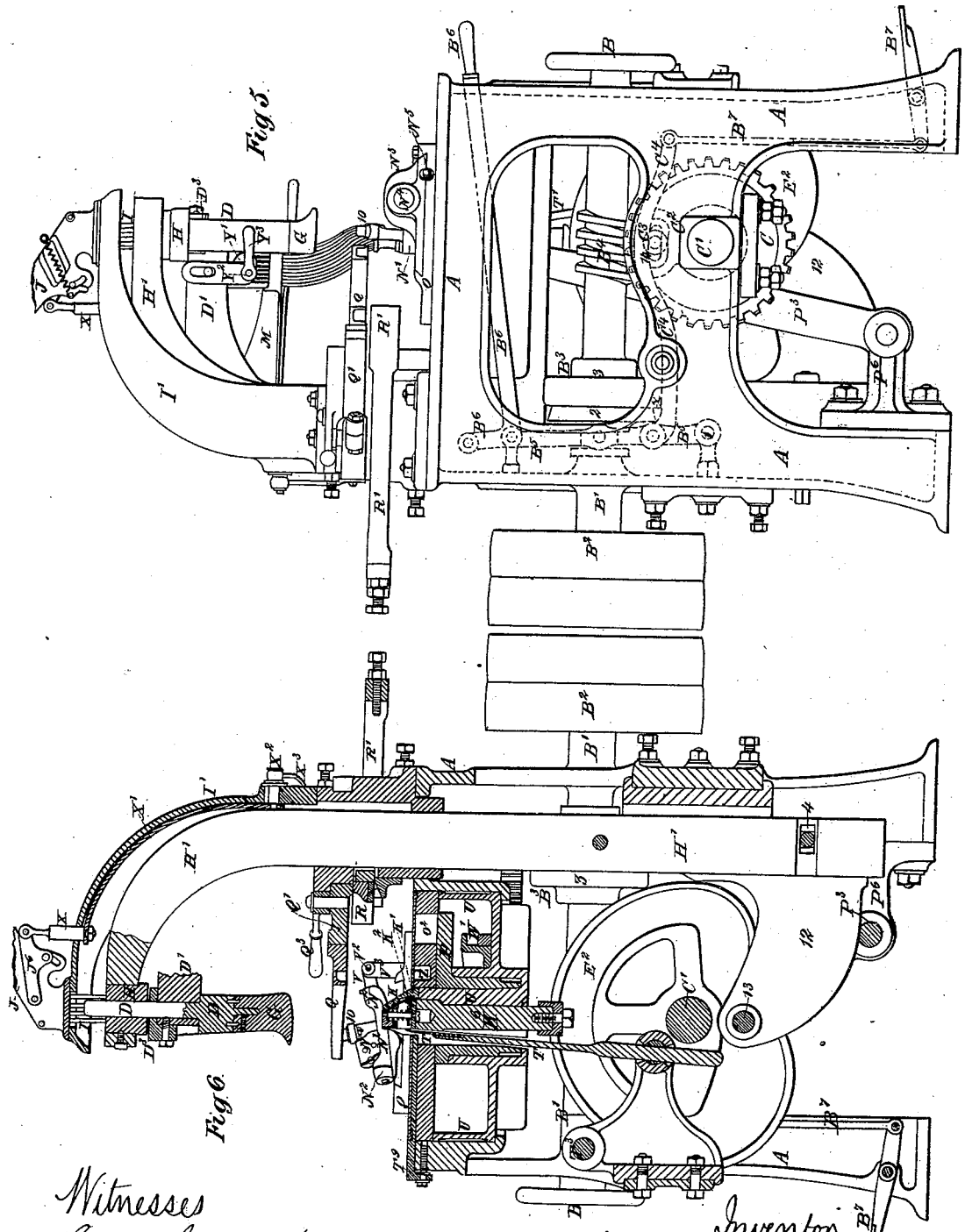

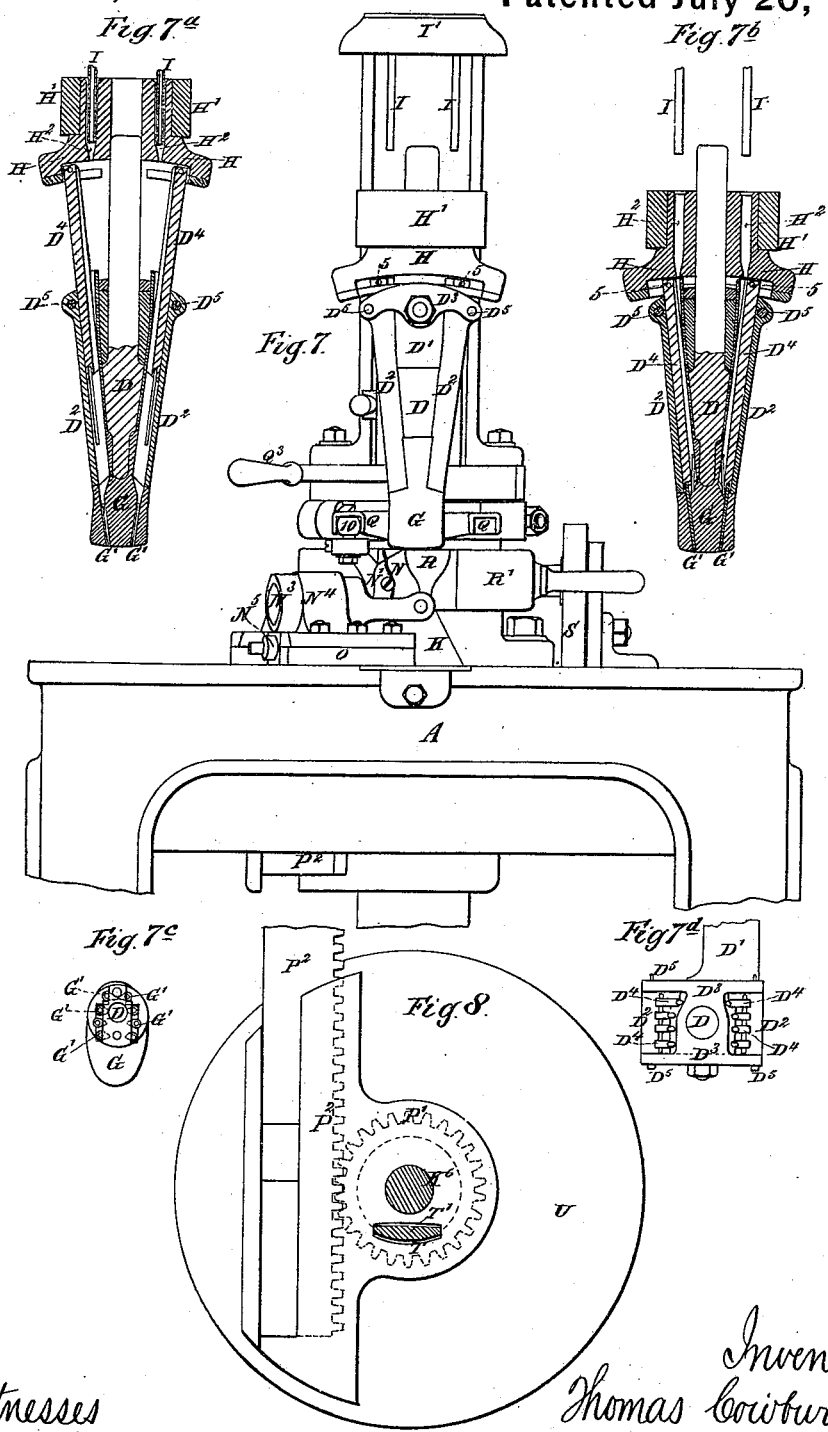
T. COWBURN.
Heeling Machine for Boots and Shoes.
No. 230,242. Patented July 20, 1880.

T. COWBURN.
Heeling Machine for Boots and Shoes.

No. 230,242. Patented July 20, 1880.

Witnesses
Henry Howson Jr.
Harry Smith

Inventor
Thomas Cowburn
by his Attorneys
Howson and Son

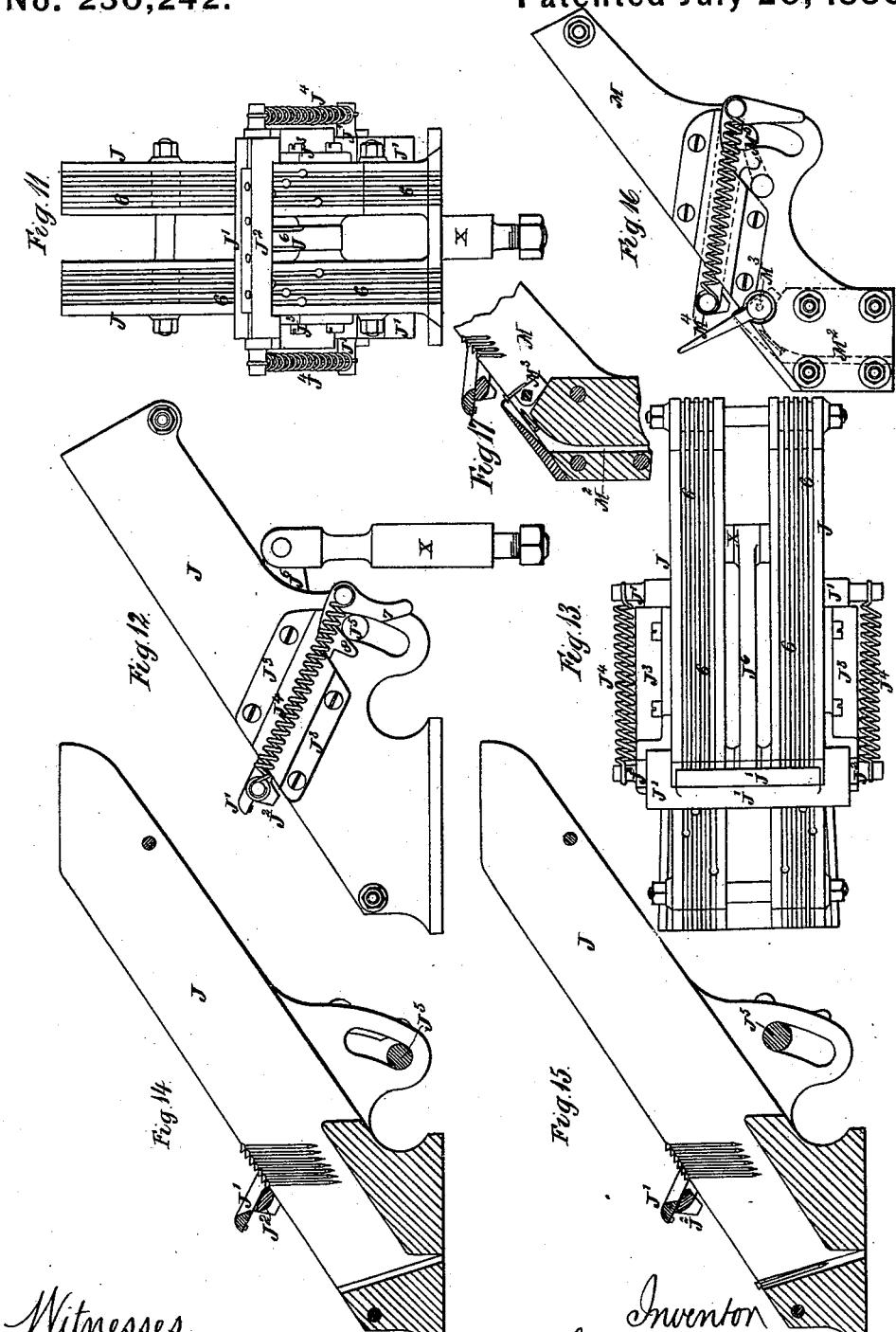

T. COWBURN.
Heeling Machine for Boots and Shoes.

No. 230,242. Patented July 20, 1880.

Witnesses
Henry Howson Jr.
Harry Smith

Inventor
Thomas Cowburn
by his Attorneys
Howson and Son

9 Sheets—Sheet 7.

T. COWBURN.
Heeling Machine for Boots and Shoes.

No. 230,242. Patented July 20, 1880.

Witnesses
Henry Howson Jr.
Harry Smith

Inventor
Thomas Cowburn
by his Attorneys
Howson and Son

9 Sheets—Sheet 8.

T. COWBURN.
Heeling Machine for Boots and Shoes.

No. 230,242. Patented July 20, 1880.

Witnesses
Henry Howson Jr.
Harry Smith

Inventor
Thomas Cowburn
by his Attorneys
Howson and Son

N. PETERS, PHOTO-LITHOGRAPHER, WASHINGTON, D.C.

9 Sheets—Sheet 9.
T. COWBURN.
Heeling Machine for Boots and Shoes.
No. 230,242. Patented July 20, 1880.
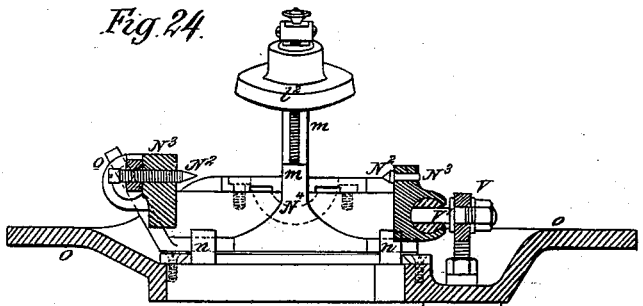
Fig. 24.
Fig. 25.
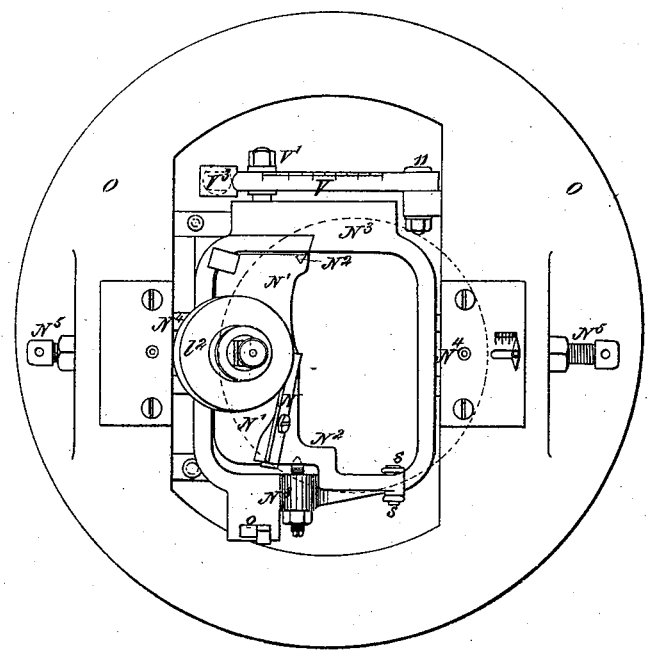
Fig. 27.
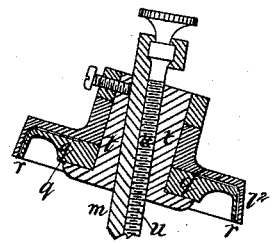
Fig. 26.
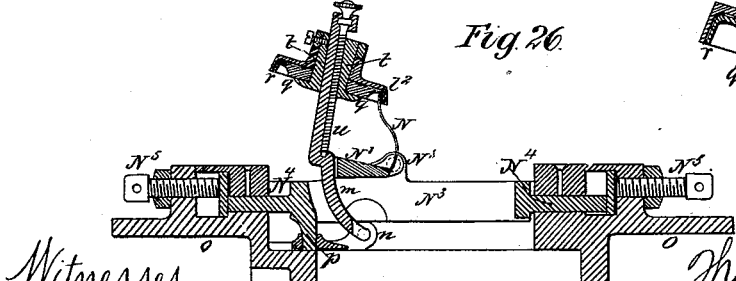
Witnesses
Henry Howson Jr
Harry Smith
Inventor
Thomas Cowburn
by his Attorneys
Howson and Son

UNITED STATES PATENT OFFICE.

THOMAS COWBURN, OF GLOUCESTER, ENGLAND, ASSIGNOR OF ONE-HALF OF HIS RIGHT TO JAMES HEASTIE, OF SAME PLACE.

HEELING-MACHINE FOR BOOTS AND SHOES.

SPECIFICATION forming part of Letters Patent No. 230,242, dated July 20, 1880.

Application filed January 29, 1880. Patented in France October 22, 1879.

*To all whom it may concern:*

Be it known that I, THOMAS COWBURN, a subject of the Queen of Great Britain and Ireland, and a resident of Gloucester, England, have invented certain Improvements in Machinery for the Manufacture of Boots and Shoes, for which I have obtained French Letters Patent October 22, 1879, and of which the following is a specification.

My invention relates to the operations of riveting the soles and heels and shaping or paring the heels in the manufacture of boots and shoes, and has reference to improvements upon the machinery or apparatus for which I obtained Letters Patent of the United States dated the 15th April, 1879, No. 214,369.

One part of my present invention relates to the apparatus or devices employed for retaining the nails or rivets in the racks or holders containing the necessary supply, and for releasing them at the requisite times.

In carrying out this part of my said invention I employ two bars arranged so as to slide one over the other in opposite directions in such a manner as to be alternately moved toward and from the rack or holder containing the supply of nails or rivets, the motion being obtained in one direction by means of springs or weights, and in the opposite direction by a moving part of the machine.

During the normal condition of the apparatus the nails or rivets contained in the rack or holder are supported by their heads by the bottom bar, the two bars being then subjected to the uncontrolled action of the spring or weights. At the requisite periods, however, under the action of a moving part of the machine, the two bars are moved in the opposite directions to that in which they are impelled by the spring or weights, whereby the top bar is first caused to approach the nails or rivets and hold or support the whole of them, except the bottom row, which continues to rest against the lower bar, and the latter then in its turn being moved the nails or rivets are consequently discharged or released.

In the case of the upper supply the nails or rivets are conducted directly into passages provided in the ram; but in the case of the lower supply (in which the nails or rivets require to be delivered heads downward) the nails or rivets are received by a supporting-tumbler, by which the nails or rivets are inverted and thence discharged into the holes in the block or rest, the tumbler being returned to its normal position by a spring or weight.

Another part of my present invention relates to the construction of the upper ram and the drivers or punches.

In carrying out this part of my invention the drivers or punches are actuated by an arm separate from that which carries the ram, and the parts of the ram in which the drivers or punches slide are hinged, so as to admit of their lower ends being adjusted to adapt themselves to different-sized heels. The drivers or punches are grooved, so as to form passages for the nails or rivets, and the motion of the parts is so regulated as to allow the nails or rivets to pass into the die or presser before the drivers or punches descend.

In the case of the lower set of drivers or punches—videlicet, those for driving nails or rivets into the top piece of the heel—I prefer to arrange such drivers or punches in groups, so as to be capable of sliding upward when impelled by the lower ram, and of being withdrawn by a spring.

My invention further relates to the shaping or paring of the heels.

In carrying out this part of my invention the knife is carried on a lever or arm pivoted on a horizontal axis level with the top of the rest or block, and the pivots are carried on a rocking frame with a horizontal axis at right angles to the knife-lever. The rocking frame is so arranged as to be capable of adjustment to or from the rest in order to vary the position of the knife to suit various sizes of heels, and the rocking frame, and with it the knife-lever and knife, are carried on a disk or plate, to which a reciprocating rotary motion is imparted, so that the disk, and with it the knife, is carried around three sides of the heel. The rocking frame, which carries the pivots of the knife-lever, is connected by a lever with a guide, which moves the cutting-edge of the knife backward and forward from an imaginary vertical line, or so as to maintain the cutting-edge in the desired position relatively to the varying configuration of the heel.

For otherwise directing the motion of the knife ordinary curved guides may be used; but I prefer to adopt the following arrangement, which constitutes an important feature of my present invention: The disk or plate carrying the rocking frame with the knife-lever and knife is formed with a circular aperture, within which is arranged an eccentric, mounted loose upon a stationary vertical shaft or axis in such a manner that the eccentric may be secured to the plate or disk at the requisite periods, so that such plate or disk shall turn bodily upon the shaft or axis, and that at other periods the eccentric may be disconnected from the plate or disk and held stationary, so that the plate or disk shall turn around the eccentric. The shaft or axis is concentric with the back part of the heel, and the radius of the eccentric and its degree of eccentricity are so arranged that when the plate or disk with the eccentric moves bodily around the shaft or axis the knife is caused to shape or pare the back of the heel, while, when the plate or disk is disengaged from the eccentric, so as to turn around the same, the knife will shape or pare one or other of the sides of the heel.

When the heels are shaped in this manner the two sides and the back of the heel form together three arcs of circles. By employing two or more eccentrics, the one around the other, cuts corresponding to an increased number of united arcs of circles are produced, and thus any required variation in the shape of the heel may be obtained.

In order to direct the upper portion of the knife, a guide-roller is employed, which is so arranged as to bear against the upper of the boot or shoe as the plate or disk carrying the knife moves around the heel, the knife being thereby guided at its upper part according to the required configuration of the heel, while at the same time the roller presses down the edge of the seating of the heel, in readiness for the operation of the knife acting in conjunction with it. The roller is hollowed out on its under side for the reception of the upper portion of the knife in the manner hereinafter more fully explained.

In order that my said invention may be fully understood, I shall now proceed more particularly to describe the same, referring to the accompanying drawings, in which—

Figure 10:
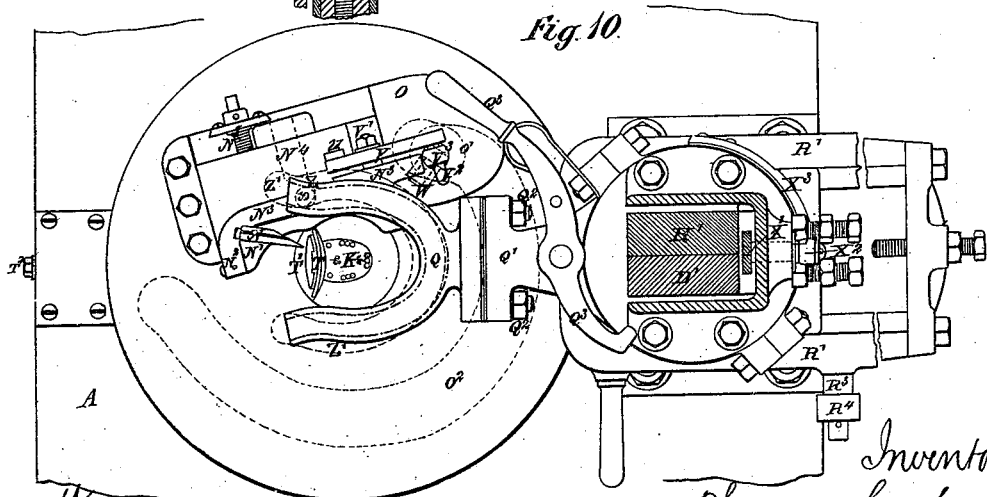
Figure 18:
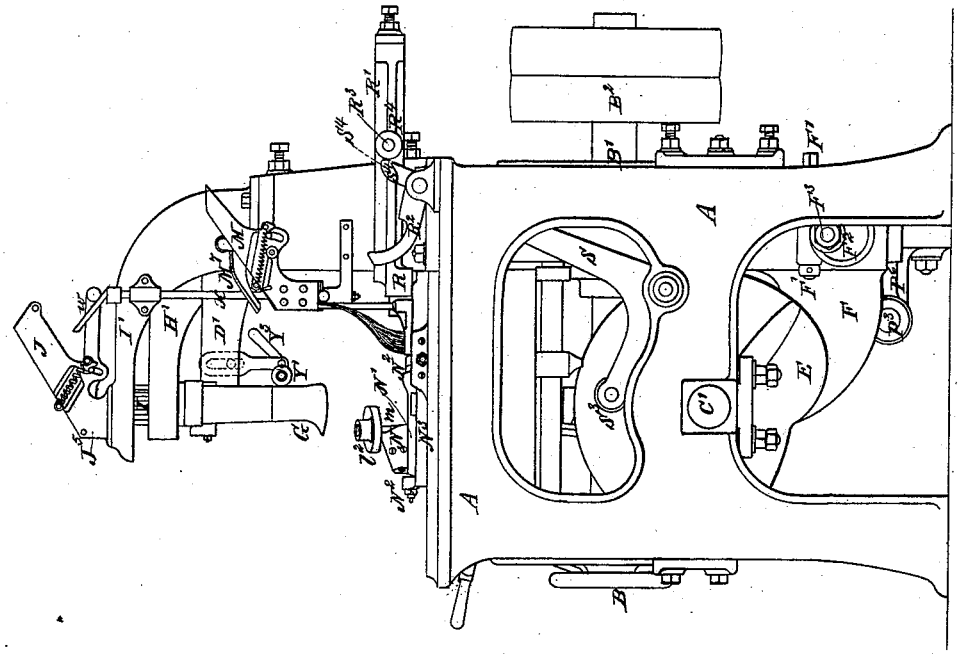
Figure 19:
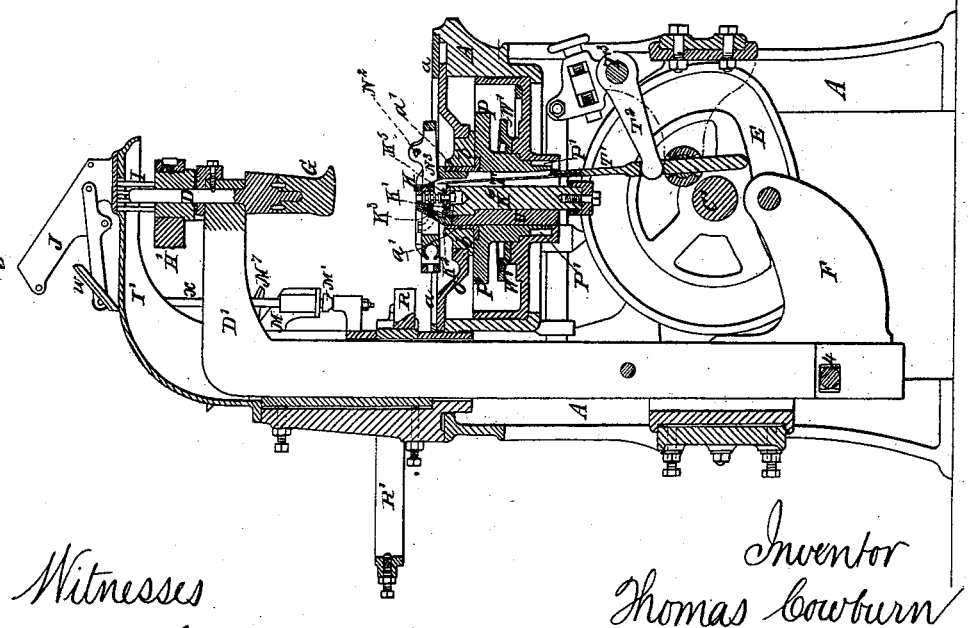
Figure 20:
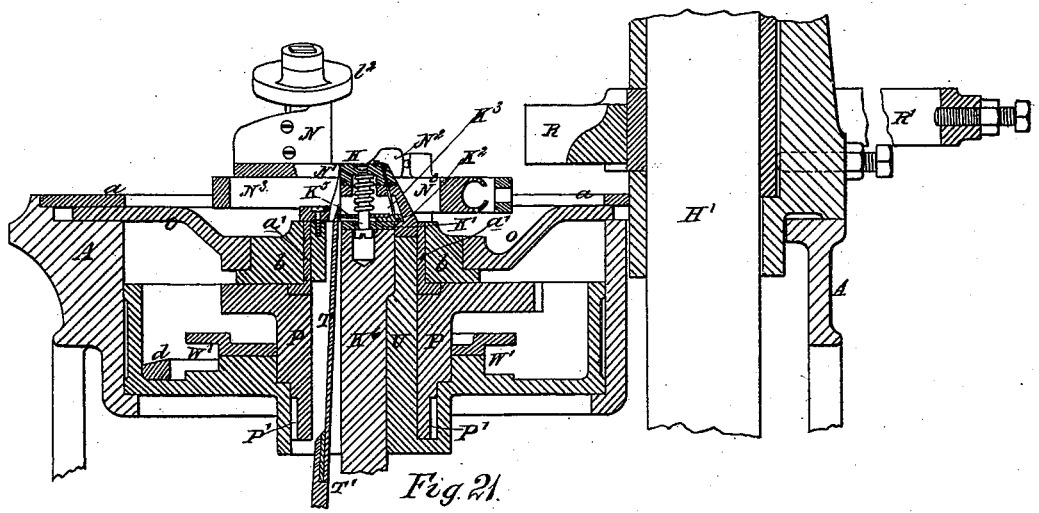
Figure 21:
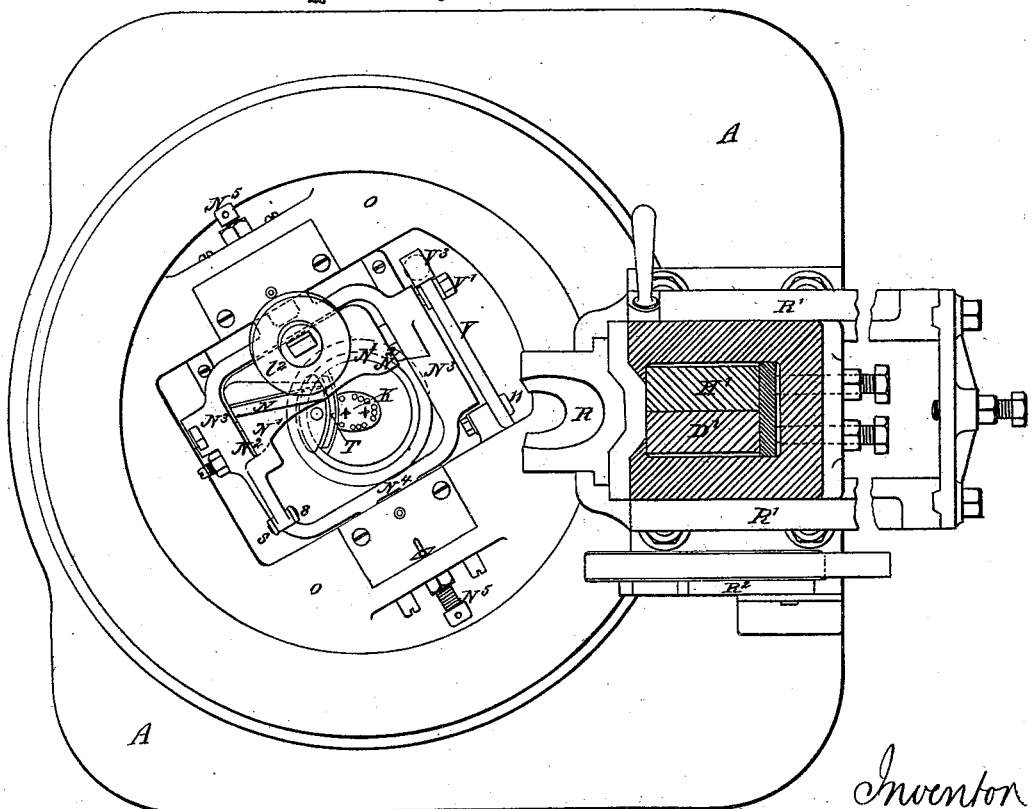
Figure 22:
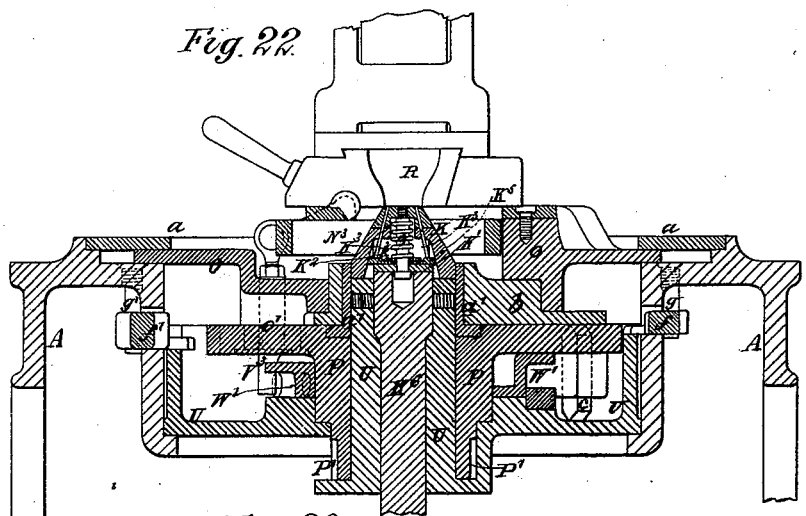
Figure 23:
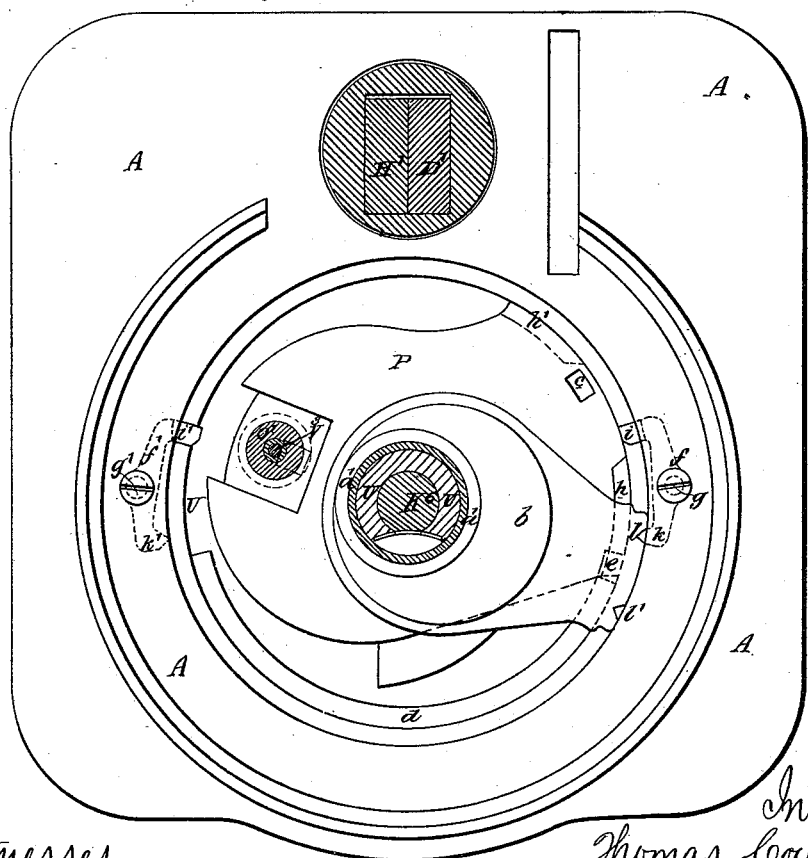

Figure 1, Sheet 1, represents a front elevation of a machine constructed according to my said invention. Fig. 2 is a side elevation. Fig. 3 is a plan, and Fig. 4 a sectional plan with the upper part of frame removed. Fig. 5, Sheet 2, is an elevation, drawn to a larger scale, of the opposite side to that shown in Fig. 2. Fig. 6 is a longitudinal section of the machine, viewed in an opposite direction. Fig. 7, Sheet 3, is an enlarged front elevation of the upper part of the machine. Figs. 7ª, 7ᵇ, 7ᶜ, and 7ᵈ are vertical sections and detached views of a portion of the apparatus shown in Fig. 7. Fig. 8 is a plan of the under side of the disk hereinafter referred to. Fig. 9, Sheet 4, is a side elevation, partly in section, and Fig. 10 is a plan, of the cutting apparatus hereinafter referred to, showing the means for obtaining reciprocating rotary motion. Fig. 11, Sheet 5, is a full-size front elevation of the upper nail or rivet feeder. Fig. 12 is a side elevation, and Fig. 13 a plan, of the same. Figs. 14 and 15 are sections, showing the action of the bars on the nails or rivets. Fig. 16 is a side elevation of the lower nail or rivet feeder. Fig. 17 is a section showing the action of the bars and tumbler. Fig. 18, Sheet 6, of the accompanying drawings, represents a side elevation of a machine with my improved knife-guiding devices applied thereto. Fig. 19 is a longitudinal section of the same. Fig. 20, Sheet 7, is an enlarged longitudinal section of a portion of the upper part of the machine. Fig. 21 is a sectional plan corresponding to Fig. 20. Fig. 22, Sheet 8, is a transverse section of a portion of the upper part of the machine. Fig. 23 is a plan of the same, partly in section, with the disk or plate hereinbefore referred to removed. Fig. 24, Sheet 9, is a transverse section of the disk and rocking frame. Fig. 25 is a plan of disk and the knife-carrying apparatus. Fig. 26 is a longitudinal section of the disk and knife-carrying apparatus, and Fig. 27 is an enlarged section of the guide-roller.

Referring to Sheets 1 to 5 of the drawings, the various parts of the machine are carried on a stand or frame, A. The motion is derived from the shaft B, mounted in bearings B', and provided with fast and loose pulleys B², Figs. 2 and 4.

On the shaft B is a friction-clutch, B³, one part of which (marked 2) is capable of sliding on feathers on the shaft, while the other part, 3, is loose, and is provided with a worm, B⁴, at one end. This worm gives motion to a worm-wheel, C, keyed on the main shaft C', which rotates in bearings C², Figs. 1, 2, and 4.

The shaft C' makes one revolution for a complete operation of the machine, and is brought to rest by the pin C³ on the wheel C, as shown in Fig. 5, coming in contact with the projection $x$ on rods C⁴, which are connected to the lever B⁵, mounted on centers or fulcra at 1 in the frame A. The lever B⁵ puts the friction-clutch B³ in or out of gear, the necessary pressure for holding the clutch in gear being given by the hand-lever B⁶.

When another operation of the machine is required, the rods C⁴ are lifted clear of the stop-pin C³ by the foot-lever and rods B⁷. The hand-lever B⁶ is connected to the lever B⁵, by which the clutch can be engaged or disengaged at pleasure. All these parts are substantially described in my above-cited United States patent.

D is the ram or holder, on which the upper part of the boot or shoe is placed, the sole having been previously attached by riveting, sewing, or otherwise. This ram or holder is carried by the arm D', Figs. 1, 2, and 4, working in suitable guides in the framing A, the said arm being lifted by the grooved cam E, acting on a roller carried in a bracket, F, which is fitted on the arm D'. (See Fig. 19.)

The bracket F is adjustable on the arm D' for different thicknesses of work by means of the worm F', Fig. 2, and revolving boss F², which is fitted in the bracket F and has worm-teeth cut on the outside, and a bolt, F³, eccentric with the boss, passing through it and into the arm D', the latter being provided with a slot in order to allow the bolt to traverse as the boss F² is rotated.

The ram D is provided on its lower end with a die or presser, G, Figs. 6 and 7, for pressing upon the inside of the boot or shoe placed thereon. This die is perforated with holes G', (see details 7ª, 7ᵇ, and 7ᶜ,) corresponding with the number of rivets or nails which are to be driven from the inside of the boot or shoe, the holes being arranged at the angle in which the rivets are to be driven.

The ram D is fitted with two cheeks, D², (see Sheet 3,) the upper ends of which are hinged by pins D⁵ to a piece, D³, fixed on the arm D'. The cheeks are formed with grooves corresponding with the holes in the die G, and each groove forms a guide for a punch or driver, D⁴, the lower ends of which punches or drivers are caused to pass into the holes in the die G, while the upper ends are provided with pins 5 adapted to slots in the cap H. The punches or drivers are actuated by this cap H, which is carried by the arm H', Fig. 6, adapted to guides in the frame and provided with a bracket, 12, having a roller, 13, actuated by the cam E², and devices 4, Fig. 6, for adjustment similar to those with which the arm D' is provided.

The cap H is curved on the under side and is provided with curved plates screwed onto projections at the ends of the cap, so as to form slots in which the pins 5 slide as the punches or drivers D⁴ are drawn out or forced into the cheeks D² when the rivets are being driven.

The portions of the punches or drivers D⁴ above the parts which pass into the holes in the die G are of larger size and of a square section.

The inner faces of the drivers are grooved out, (see Figs. 7ª, 7ᵇ, and 7ᵈ,) so as to form channels or passages for the nails or rivets to pass down, and the upper parts of the holes in the die G are widened out conically, so that when the lower parts of the punches or drivers are withdrawn from the holes in the die G a clear passage is left for the nails or rivets, which, when the punches or drivers descend, are driven through the insole into the heel.

The die G can be readily changed to suit the size of the heel, the cheeks D² being adapted to open out to suit the larger ones and to close in for the small ones, the angles of the nails or rivets being greater in the small ones and less in the larger ones.

The nails or rivets are conveyed to the ram by small tubes I, (one to each channel,) which are fixed to the bracket I', Figs. 2, 5, and 6, secured to the frame A of the machine. Holes H² in the cap H permit the tubes I to enter the cap when the arm H' ascends.

The nails or rivets are conveyed to the tubes by the racks or guides J, (shown full size in Figs. 11, 12, 13, 14, and 15,) the said racks or guides having inclined grooves, 6, to allow the rivets to slide partly down with the heads or shoulders resting on the edges. The bars J' and J² slide on each other in the guides J³, and are drawn together by the springs J⁴.

When the nails or rivets are fed into the inclined grooves the heads of the lowest row rest against the lower bar, J², (see Fig. 14,) and when the striker J⁵ is lifted by the lever J⁶, as hereinafter explained, it strikes the inclined face at 7, Fig. 12, and the top bar, J', or an attachment thereto, is forced against the rack and pushes back all the rivets except the last row, which shall rest against the bar J². On the striker J⁵ still rising it acts on the incline 8 on the bar J², and pushes it away from the heads of the nails or rivets, and allows them to run down the racks into the tubes I. On the striker descending the springs J⁴ draw the bar J² toward the racks and the bar J' from the racks, which allows the last row of nails or rivets to fall against the bar J², Fig. 14.

The lever J⁶, Fig. 6, which lifts the striker J⁵, is connected to the rod X, carried by the bent bar X', which passes down inside the bracket I', carrying the racks J. On the lower end of the bar X' is a stud and roller, X², which is so situated that when the inclined surface X³, which is secured to the part Q', Figs. 5, 6, 9, and 10, is moved as the guide Q is turned out of the way, as hereinafter described, the inclined surface X³ lifts the roller X², and so actuates the bars J' J².

The die G is maintained in close contact with the insole by the cam E, and holds the heel firmly on the block K, which rests on the disk U on the stand or table A. The clip or cap R is employed in order to maintain the lifts and top piece of the heel in position previously to the descent of the die G and during the operation of attaching the heel to the sole.

The block K, Figs. 6 and 9, which is perforated with holes corresponding to the number of nails or rivets required in the top piece or under side of the heel and at the angle the rivets are to be driven, is made hollow and has a piece, K', fitted to move up inside a distance a little greater than the longest nails or rivets to be driven. On this piece rest plates K², into which the punches K³ are fitted in groups, Fig. 10, the block K having grooves or recesses for the plates to slide in, and at the same angle as the holes in the block. On the plates K² rests a washer, K⁵, and between this washer and the top of the block is introduced a spiral spring, 9, which tends to keep the plates, and with them the punches or drivers, in the position shown in Fig. 9.

The lifting-piece K' is elevated by the ram K⁶, which is actuated by the projection L, fixed on the periphery of the cams E and E², Fig. 4. The rivets are fed into the holes in the block K by the rack M, (shown full size in Figs. 16 and 17, Sheet 5,) which swings on the stud M' and extends over the block K when the ram D is in its elevated position, Figs. 1, 2, and 3. The rack is fitted with grooves corresponding to the maximum number of nails or rivets required in the top piece of the heel, and is provided with bars, guides, striker, and springs, similar to the upper guides described above with reference to Figs. 11, 12, and 13. The nails or rivets, however, on being released by the lower bar, instead of passing direct into the tubes $M^2$, Figs. 1, 2, and 16, are received by a supporting-tumbler, $M^3$, Fig. 17, which is turned by the lever $M^4$, Fig. 16, thus causing the nails or rivets to be inverted and discharged, head downward, into the tubes $M^2$, whence they pass into the holes in the blocks K. The striker $M^5$, Figs. 12 and 16, is actuated by the lever $M^6$, provided with a roller, Y, which, on the rack M being turned on the stud M', is caused to run up the inclined surface $M^7$, and so lifts the striker, Figs. 1, 2, and 3. On turning the rack back into position, with the tubes $M^2$ over the holes in the blocks K, the striker falls, and so releases the last row of nails or rivets.

When the sole has been attached to the heel by the forcing in of the nails by the punches $D^4$, and the top piece has been secured by the nails or rivets being forced up by the punches $K^3$, the clip or cup R is withdrawn out of the way of the cutting or paring knife N, which is designed to pare round three sides of the heel, and which next comes into operation.

The cutting or paring knife N is made of the desired shape of the outline of the heel, and is fixed on a holder or arm, N', pivoted on a horizontal axis at $N^2$ on a frame, $N^3$, level with the top of the rest or block K, Figs. 6, 9, and 10.

The frame $N^3$, in which the knife-holder is pivoted, is provided with a horizontal axis adapted to a bearing, $N^4$, at right angles to the pivoting-line $N^2$, so that the frame $N^3$ with the knife-holder can rock or vibrate in the said bearing. The bearing $N^4$ is adapted to dovetailed guides on a plate, O, and can be adjusted in said guides by the screw $N^5$, Figs. 7 and 10.

The plate O is provided with a stud or projection, O', which passes through a curved slot, $O^2$, Figs. 6, 9, and 10, in the top of the table or frame, and is connected to a crank-arm. To this crank-arm is imparted a reciprocating rotary motion by means of a rack-pinion, P', which gears into the rack $P^2$, Figs. 7 and 8, the latter being moved backward and forward by the lever $P^3$, which is mounted at its lower end on a pin carried in the bracket $P^6$, and is actuated by a roller and a cam, $P^5$, Figs. 1, 2, 4, and 5. The plate O is provided on its under side with another stud or projection, with a roller, Z, Fig. 10, which moves in a slot or grooves, Z', Fig. 9, of the same form as the bottom of the heel, and guides the cutting-knife N round the heel. The ends of the grooves Z' are turned outward, to draw the knife farther from the heel when the cut is finished and before it commences, Fig. 10.

To the bearing $N^4$, which is the axis of the rocking frame $N^3$, is pivoted the lever V, Fig. 10, which is provided with a slot and with a stud, V', which latter engages in a slot in the rocking frame $N^3$. The lever V is provided with a fixed stud, $V^2$, Figs. 9 and 10, at the outer end, carrying a rod, $V^3$, the said rod passing down through a hole in the stud or projection O', and having screwed into it an appendage provided with an eye to which a stud and roller are connected. This roller works in a guide, W', Figs. 6 and 9, fixed in the disk U, which is of such a form as to raise or lower the rod $V^3$, and with it the lever V and rocking frame, so that the cutting-edge of the knife N can be moved backward and forward from an imaginary vertical line in order to maintain the cutting-edge at the proper angle when cutting heels with considerable difference between the top and bottom. The amount of rocking is determined by moving the stud V' nearer to or farther from the fulcrum of the lever V.

The upper part of the knife-holder N' is fitted with an adjustable stud and roller, 10, Figs. 7, 9, and 10, which engages a curved groove or guide, Q, made of a shape corresponding to the upper part of the heel, and which may be of any desired different shape from the bottom part of the heel. This guide is secured to a part, Q', by screws $Q^2$, and can be adjusted by liners placed between the two faces. The part Q' rotates on that portion of the frame which guides the upper part of the arms D' and H', and is held in position by the catch-lever $Q^3$, Figs. 9 and 10, so that while the upper part of the boot or shoe is being placed on the ram D, and the cup or holder R is being fitted, the guide Q is turned out of the way by the handle with which the said lever is provided. The cup R is carried by a sliding frame, R', which slides in suitable guides on the part on which Q' rotates, and is held in position by a catch, $R^2$, engaging with the stud $R^3$, Figs. 1, 2, and 3. On the stud is a roller, $R^4$, against which the lever S, Fig. 2, acts to draw back the cup after the die G has pressed the material of the heel firmly on the block K and the nails or rivets have been driven.

The lever S, Fig. 2, fits on the stud S', and is actuated by the cam or wipers $S^2$ and roller $S^3$. On the upper end of a lever, S, is an inclined surface, $S^4$, which, when the lever begins to move, strikes the projecting part on the catch $R^2$, and depresses the catch, so that the stud $R^3$ can pass.

After the heel has been pared round the three sides by the knife N, and while the knife is returning, the front of the heel is cut by another knife, T, Fig. 6, which is hollowed to the shape required. This knife is provided with a dovetail projection, which fits into a corresponding recess on the stock or slide T', which moves in a recess in the center piece, U, Fig. 9. The slide is actuated by the lever T², Figs. 4 and 19, which is keyed onto a shaft, T³, on which another lever, T⁴, is keyed. Another lever, T⁵, is loose on the shaft, and is fitted with a roller, T⁶, Figs. 1, 2, and 4, which is lifted by the inclined cam-projection T⁷, fixed on the side of the cam E, and another projection forces the roller T⁶ down after the cut is completed. The levers T⁴ T⁵ are connected together by a bolt, and a slot is provided, so as to enable the lift of the knife T to be adjusted for different thicknesses of heels. The knife T is also adjusted for different sizes of heels by the slide and screw T⁹, against which the knife T bears when cutting, Figs. 1, 2, 6, and 9.

For assisting in holding the upper part of a boot on the ram D, a roller, Y, Fig. 5, is provided, which is carried on a pin eccentric with the axis Y², on which is a lever, Y³. The axis is carried on a bracket supported on the arm D', and made adjustable for different lengths of uppers. The roller Y' is composed of india-rubber or other suitable yielding material, with a metal bush inserted therein.

In the arrangement of apparatus hereinbefore described with reference to Sheets 1 to 5 of my drawings, guides Q, Z', and O² are used for directing in part the motion of the cutting mechanism. I make no claim, however, to the use of these guides as forming any part of my present invention, and prefer to employ in substitution therefor the improved guiding devices next hereinafter described, with reference to Sheets 6 to 9 of my drawings.

The disk O, Figs. 19, 20, and 21, which is held down to the frame A by a ring, $a$, is fitted so as to be capable of rotating upon an eccentric, $b$, which is itself capable of turning upon a bush, $a'$, fitted on the central annular boss of the disk U, and which forms the axis of the eccentric, Figs. 19 and 20. The object of the eccentric is to guide the cutting apparatus round the heel in a curvilinear course corresponding to the shape of the heel. For this purpose it is necessary that the eccentric should be secured to the disk O or its connections at certain periods, so that the eccentric and disk O may turn bodily round the axis, and that at other periods the eccentric should be disconnected from the disk and held stationary, so that the disk may turn round the eccentric.

In the example illustrated the center of the axis coincides with the center of the arc forming the back of the heel, and the center of the throw of the eccentric is the center from which the side of the heel is struck. By securing, therefore, the eccentric to the disk or its connections in passing round the back of the heel, and by disengaging the eccentric from the disk and locking the former while passing round the sides, the heel will be cut or pared to the desired shape.

The required locking and releasing and engagement and disengagement of the eccentric and disk are obtained in the following manner: In order to cause the eccentric to partake of the motion of the disk a vertical bolt, $c$, Fig. 22, is employed, passing through the driving-arm P, and which is caused to rise under the action of a lifting-guide, $d$, Figs. 20 and 23, provided on the disk U, and enter an aperture, $e$, in the eccentric $b$, Fig. 23, and thus secure the eccentric to the driving-arm P, which imparts motion to the disk with the cutting apparatus.

In order to lock the eccentric $b$, or hold it stationary while the disk O, carrying the cutting apparatus, turns, swivel catches or bolts $f f'$, Figs. 22, 23, are employed, mounted upon centers or fulcra $g$ $g'$ in the frame A, and so arranged as to be brought successively into action in the following manner, viz: When one side of the heel is being operated on a portion of the periphery of the driving-arm P acts upon the extremity $i$ of the catch $f$, thereby maintaining the other extremity, $k$, of such catch in a notch or recess, $l$, in the eccentric. When the other side of the heel has to be operated upon the driving-arm P is caused to act upon the extremity $i$ of the catch $f'$, and thereby force the extremity $k'$ of such catch into a notch or recess, $l'$, in the eccentric. These catches are released when the recesses $h$ $h'$ (in different planes) are respectively brought opposite to the extremities $i$ $i'$ of the catches $f f'$. By so timing, therefore, the motions and arranging the parts that when one side of the heel has been operated upon the swivel-catch corresponding to that side is thrown out of action and the bolt $c$ is actuated in order to enable the back of the heel to be operated upon, and that when the back of the heel is pared the bolt $c$ shall be released and the other swivel-catch brought into action to enable the other side of the heel to be operated upon, the required conditions will be fulfilled.

I employ for directing the motion of the upper part of the knife a guide-roller, $l^2$, Figs. 24, 25, 26, and 27, which is carried on a lever or arm, $m$, mounted in bearings or fulcra $n$, connected to the rocking frame N³ at $p$, so as to partake of its longitudinal motion for adjustment, and also connected to the said rocking frame by an inclined portion at $o$, so that as the rocking frame rises and falls it acts on the incline at $o$, Figs. 24 and 25, and moves the lever or arm $m$, and with it the roller $l^2$, in a lateral direction, and maintains the roller opposite the upper edge of the knife N as the latter is moved laterally by the rocking frame N³.

The periphery of the guide-roller is caused to press against the upper part of the boot or shoe, and as the knife moves round the heel the roller runs round the upper, its edge smoothing down the seating of the heel in readiness for the operation of the knife N, which acts in conjunction with it.

The roller is hollowed out on its under side, and a recessed ring, $q$, is inserted, so that a rim is left at $r$ of a thickness equal to the distance which it is desired that the heel should project from the upper. The upper portion of the knife passes up within the ring $q$, which receives its pressure, the knife-holder being acted upon by a band-spring at $s$, or its equivalent, so as to cause the knife to press against the inside of the ring $r$ and hold it in contact with the upper of the boot or shoe.

The roller is mounted loose upon a bush, $t$, through which passes a non-traversing screw, $u$, by operating which the roller may be raised or lowered in order to adjust its position to suit different thicknesses of heels.

If required, an auxiliary knife may be used for shaping or paring the seating of the heel.

Under the present arrangement the striker for operating the nail or rivet feeding devices of the upper rack, J, may be conveniently actuated by means of an incline, $w$, Figs. 18 and 19, on the extension $x$ of the axis of the lower rack, M, the act of turning the latter into position having thus the effect of releasing the required supply of nails or rivets from both the racks J and M simultaneously.

I claim as my invention—

1. The combination of the inclined guides or racks for the nails or rivets with sliding bars $J'$ $J^2$, spring or springs, and devices, substantially as described, for sliding one bar in and the other out against the action of said spring or springs.

2. The combination of the guides or racks for the nails or rivets with sliding bars $J'$ $J^2$, provided with inclined faces 7 8, springs $J^4$, and striker $J^5$, all substantially as set forth.

3. The combination of the inclined nail or rivet racks with movable bars for retaining and releasing the nails or rivets and a turning-tumbler, $M^3$, substantially as described.

4. In a boot and shoe heeling machine, the combination of a die or presser for the heel with a ram provided with nailing-punches and adjustable cheeks $D^2$, whereby the ram is adapted to receive different-sized dies or pressers.

5. The combination of a ram, D, and punches and cheeks $D^2$, pivoted to the ram and grooved on their inner faces for the reception of the punches, with a die or presser provided with openings in line with the grooves in the cheeks.

6. The combination of the ram, cheeks, and cap with the punches arranged at an angle in the said ram and cheeks, and provided with pins at their upper ends, adapted to curved slots in the said cap.

7. In a boot and shoe heeling machine, the combination of the paring-knife and devices carrying said knife with a guide, Q, for guiding the motion of the knife and adapted to be turned away from the said knife and operating devices, substantially as set forth.

8. In a boot and shoe heeling machine, the combination of devices for holding the boot or shoe with a knife-holder pivoted to a rocking frame having an axis adapted to a bearing at right angles to the pivoting-line of the knife-holder.

9. The combination of boot or shoe holding devices with the knife-holder and rocking frame $N^3$, carried by a plate having a reciprocating rotary motion, and with a guide or guides for the said frame, and devices, substantially as described, for tilting the rocking frame as the said plate moves around the heel of the boot or shoe.

10. In a boot and shoe heeling machine, the combination of a knife and knife-carrying devices with a wheel for imparting a rotary motion to said devices and knife and an intermediate eccentric for guiding said motion.

11. The combination of the cutting devices of a boot and shoe heeling machine and a disk, O, carrying said devices with a wheel for imparting rotary motion to the disk, and an intermediate eccentric and devices for automatically connecting the eccentric with the driving-wheel and with a stationary part of the frame alternately, substantially as set forth.

12. The combination of the cutting-knife of a boot and shoe heeling machine with a roller, $l^2$, recessed for the reception of the upper part of the knife.

In witness whereof I have signed my name to this specification in the presence of two subscribing witnesses.

THOMAS COWBURN.

Witnesses:
    JAMES KELDING,
        *Midland Road, Gloster.*
    JAMES PLATT,
        *Bristol Road, Gloucester.*